US006488210B2

(12) United States Patent
Schumi et al.

(10) Patent No.: US 6,488,210 B2
(45) Date of Patent: Dec. 3, 2002

(54) DISC-SHAPED COUNTER IN THE FORM OF A PLASTIC RING WITH A FILLER PIECE

(75) Inventors: Christian Schumi, Villach (AT); Harald Schermann, Oberloisdorf (AT)

(73) Assignee: HTP High Tech Plastics AG (AT)

( * ) Notice: Subject to any disclaimer, the term of this patent is extended or adjusted under 35 U.S.C. 154(b) by 0 days.

(21) Appl. No.: 10/104,098

(22) Filed: Mar. 22, 2002

(65) Prior Publication Data

US 2002/0096567 A1 Jul. 25, 2002

Related U.S. Application Data

(62) Division of application No. 09/458,327, filed on Dec. 10, 1999.

(30) Foreign Application Priority Data

Sep. 9, 1999 (EP) .......................................... 99117748

(51) Int. Cl.[7] .............................................. G06K 19/02
(52) U.S. Cl. ....................................... 235/488; 235/492
(58) Field of Search ................................. 235/488, 494

(56) References Cited

U.S. PATENT DOCUMENTS

| | | | |
|---|---|---|---|
| 2,050,154 A | | 8/1936 | Beck |
| 2,638,706 A | | 5/1953 | Seale |
| 3,211,267 A | | 10/1965 | Bayha |
| 3,953,932 A | | 5/1976 | Graves |
| 3,968,582 A | | 7/1976 | Jones |
| 4,814,589 A | * | 3/1989 | Storch et al. ............... 235/494 |
| 5,216,234 A | | 6/1993 | Bell |
| 5,406,264 A | | 4/1995 | Plonsky et al. |
| 5,636,565 A | | 6/1997 | Lawrance et al. |
| 5,676,376 A | | 10/1997 | Valley |
| 5,683,251 A | | 11/1997 | Logan et al. |
| 5,803,459 A | | 9/1998 | Casas-Salat |
| 5,895,321 A | | 4/1999 | Gassies |

FOREIGN PATENT DOCUMENTS

| | | |
|---|---|---|
| EP | 0700644 | 9/1994 |
| EP | 9540743 | 9/1995 |
| FR | 90 00514 | 1/1990 |
| WO | WO 96/25066 | 2/1995 |
| WO | WO 96/03725 | 7/1995 |

* cited by examiner

*Primary Examiner*—Harold I. Pitts
(74) *Attorney, Agent, or Firm*—St. Onge Steward Johnston & Reens, LLC

(57) ABSTRACT

The invention relates to a disc-shaped counter, in particular a casino chip, essentially consisting of at least one ring-shaped plastic part and a filler piece held inside a recess in this plastic part, which is applied on to the filler piece in such a way that the plastic ring surrounds the rim of the filler piece radially and axially in an at least partly form-fitting fashion. The filler piece and/or plastic ring contain a material that is detectable in slot-machines. The plastic ring is preferably applied on to the filler piece by a plastic injection moulding process. The counter according to the invention has a more attractive design, is considerably easier and cheaper to produce, and has greater durability, than conventional counters with inserts.

9 Claims, 2 Drawing Sheets

DISC-SHAPED COUNTER IN THE FORM OF A PLASTIC RING WITH A FILLER PIECE

CROSS-REFERENCE TO RELATED APPLICATIONS

This is a divisional of copending U.S. patent application Ser. No. 09/458,327, filed Dec. 10, 1999.

BACKGROUND OF THE INVENTION

The invention relates to a disc-shaped counter in the form of a plastic ring with a filler piece, according to the introductory part of claim 1. Examples of possible applications of the subject-matter of the present invention are: playing chips for casinos or amusement arcades, tokens for sales promotions, value-tokens, gaming machine tokens, parking tokens, shopping tokens, and identity tokens e.g. for use in hotel chains.

A disc-shaped plastic counter of this kind is known for example from the subject-matter of EP 444373 A1. In this known plastic counter, the filler piece is inserted in a central recess of a plastic ring, the filler piece being pressed into, and held in place by, an inner peripheral annular groove in the plastic ring.

One drawback of this technique is the increased assembly and logistical costs due to the fact that, after the plastic part and the filler piece have been separately produced, it is necessary to insert the filler piece into the central recess of the plastic part in a separate working step.

Another drawback is that the joint between the outer ring-shaped part and the inner filler piece is a simple sticking joint (frictional connection); such a snap-in connection is not necessarily capable of withstanding heavy stresses.

A further drawback of the embodiments according to EP 444373 A1 is that the filler piece, which is the element which is stamped or engraved with the significant information, is inlaid in the plastic ring about level with the surface of the latter, and is thus exposed to increased mechanical wear and tear (e.g. scratching)—shortening the useful life of disc-shaped plastic counters of this type.

Nor is it known, in conventional disc-shaped plastic counters of this kind that are used as tokens, to insert a filler piece which could render the tokens suitable for use in slot-machines, since the appropriate additional metallic materials are not employed.

Therefore the problem which lies at the basis of the invention is to develop a plastic counter of the kind stated at the outset so that it is more attractive in appearance; considerably easier and cheaper to produce; more durable; and also suitable for use in conventional slot-machines (e.g. gaming machines).

SUMMARY OF THE INVENTION

The essential features of the invention are that the disc-shaped counter essentially consists of at least one ring-shaped plastic part and a filler piece held inside a recess in this plastic part, which is applied on to the filler piece in such a way that the plastic ring surrounds the rim of the filler piece radially and axially in an at least partly form-fitting fashion, and that the filler piece and/or plastic ring contains a material that is detectable in conventional slot-machines.

The plastic ring is preferably applied on to the filler piece by an injection moulding process, but can also be applied by other methods such as bonding, pressing, pouring, shrinking on, clamping on, or the like.

A completely secure form-fitting joint is thus formed between the plastic part and the rim of the filler piece, without any significant mechanical stresses; the need for further processing of the plastic counter is eliminated; and the useful life of the plastic counter is considerably extended in comparison with conventional plastic counters of a similar kind.

In a preferred embodiment of the invention, the plastic ring is applied over the whole circumference of the filler piece, within a certain peripheral region; however, it is also possible to surround (radially and/or axially) only parts of the peripheral region of the filler piece with the plastic ring.

The plastic ring is preferably highly resistant to wear and abrasion, and capable of undergoing any desired form of graphic design; it may be made either in the same colour as the filler piece, or in any other desired colour. Alternatively, it can for example be made transparent or translucent, and be provided with lenticular faces. The rim of the plastic ring may be made in a variety of forms, and may be e.g. round, polygonal, or the like. The primary benefit of high abrasion-resistance is the prevention of so-called white fracture at the edges of the plastic ring (phase separation of elastomeric from thermoplatic component), and also on the graphic design itself.

The exposed surface of the plastic ring and/or filler piece may be provided with a mechanical impression, such as a face value, and this can additionally be in the form of an embossed coding e.g. in braille or the like.

To provide security against forgery, security printing processes, and additional pigments, colourings, etc., can also be employed on or in the plastic ring and on or in the filler piece.

Pigments employed may be fluorescent and/or luminescent security elements which can be excited e.g. by ultraviolet radiation, visible light, an electrical field, or even thermal radiation. It is also possible to incorporate glass beads or elements possessing special light-reflecting effects within the plastic ring and/or filler piece, either on their own or in combination with the abovementioned security elements. Holograms may also be provided as a security feature in or on plastic ring and/or filler piece. By placing specially prepared films inside, or on the surface of, the counter, the counter can be personalized, or individually marked in some other way, e.g. by means of a laser.

The plastic ring and/or filler piece can be printed by all known printing processes. Very precise colours and very high colour fidelity, with very strong colour tones, can be obtained. In accordance with the invention a very large display area is available for such printing, including practically the entire surface of the plastic ring and filler piece, and also, if a suitably transparent surface is provided, the interior of the plastic ring and filler piece.

Preferred materials for the plastic ring are injection-mouldable thermoplastics such as polystyrene, polyethylene, polymethyl methacrylate, polyamide, polyoxymethylene, polybutylene glycol terephthalate, cellulose acetate butyrate, polyphenyl siloxane, acrylonitrile butadiene styrene, polycarbonate, or butadiene-styrene block copolymer; or polyurethane etc. The thermoplastic material for the plastic ring can also be thermochromic, e.g. one changing colour at 32°.

To improve the handling quality of the surface of the plastic ring, at least one suitable other plastic material possessing lower hardness and higher roughness and thus giving the counter a high-quality, attractive "soft touch" may additionally be applied to at least parts of the outer region of the plastic ring.

The preferred material for the filler piece is a metal alloy (coin), enabling the counter to be used both at the casino table and in a gaming machine or other slot-machine. The metallic filler piece must therefore be capable of being detected, for example by inductive or capacitive methods.

The metal filler piece has a central impression region on its surface, on which information such as a face value, or any other number, is shown.

As an alternative to the coin as filler piece, a plastic filler piece yielding special effects may be used, but care must be taken to ensure that it is suitable for use in a slot-machine, that is to say, the counter must be detectable e.g. by inductive and/or capacitive methods. A possible way of achieving this is to incorporate fine metal particles 9, suitable for use in slot-machines, within the material of the plastic filler piece, and/or apply such particles to its surface. (See FIG. 4). These metal particles 9 may be magnetic, or may be magnetizable in which case they constitute a detectable security and/or registration mark. The usual size of such metal particles 9, which are also called "tinsel", is around 100 $\mu$m. It is also possible to apply or incorporate a metallic layer 10 on or in the plastic body of the inserted piece, in which case the laminated plastic filler pieces can be stamped, easily and at low cost, out of sheets of material. (See FIG. 5)

Like the plastic ring, the filler piece is preferably more or less disc-shaped, and the edge or edges can show the same variants as the plastic ring.

Both the plastic ring and the filler piece are preferably made rotationally symmetrical, in their annular form and disc form respectively.

To improve the connection between the plastic ring and the filler piece, e.g. more or less axial extensions can be provided on the plastic ring and/or filler piece which in the overlapping marginal region project from the plastic ring into the filler piece and/or from the filler piece into the plastic ring.

The filler piece is preferably centred in the plastic ring in both axial and radial directions, and so has optimal protection against mechanical damage. This is all the more important because the most significant information is preferably displayed on the filler piece, in a central impression region of its surface.

Furthermore, the stackability of the counters can be improved by providing small ridges and/or grooves extending more or less axially from the surface of the plastic ring. When the counters are stacked on one another, a ridge on one counter will then engage in a groove in the adjacent counter. Alternatively, an axial annular ridge may be provided on the plastic ring on one side of the counter, and another axial annular ridge, but of smaller diameter, on the other side of the counter. These ridges of different diameters then engage in one another when two counters are placed one on top of the other, so that extremely stable, tall stacks can be obtained.

Other notable features of these materials are their good chemical resistance and light fastness, and the pleasing chink of the counters when used as gaming chips.

Choice of counter size includes the 36 and 40 mm diameters of the EU standard, and diameters of 34, 38, 43 and 45 mm are also possible.

The weight that can be obtained, if the selected material is polypropylene with 50% glass or polyamide and polyoxymethylene with approximately 70% barium sulphate added, is about 10 grams.

Owing to the fact that the filler piece extends over the whole area of the plastic part (and is not located only in the central region), considerably greater volume and weight are obtained. This is one of the essential requirements for amusement arcade tokens, which must have a certain minimum weight. With the subject-matter of the present invention this minimum weight can be obtained very easily, as the filler piece extends over practically the entire outer diameter of the token and is not restricted to the central region only.

The subject-matter of the present invention derives not only from the subject-matter of the individual claims but also from the individual claims taken in combination. All details and features disclosed in the documents, including the Abstract, and especially the physical form illustrated in the drawings, are claimed as essential to the invention in so far as they are novel, whether separately or in combination, with respect to the state of the art.

The invention will now be described in detail with reference to drawings illustrating just one way of carrying out the invention. Further features essential to the invention and advantages of the invention will be apparent from the drawings and their description.

DESCRIPTION OF THE PREFERRED EMBODIMENT

Figure 1:
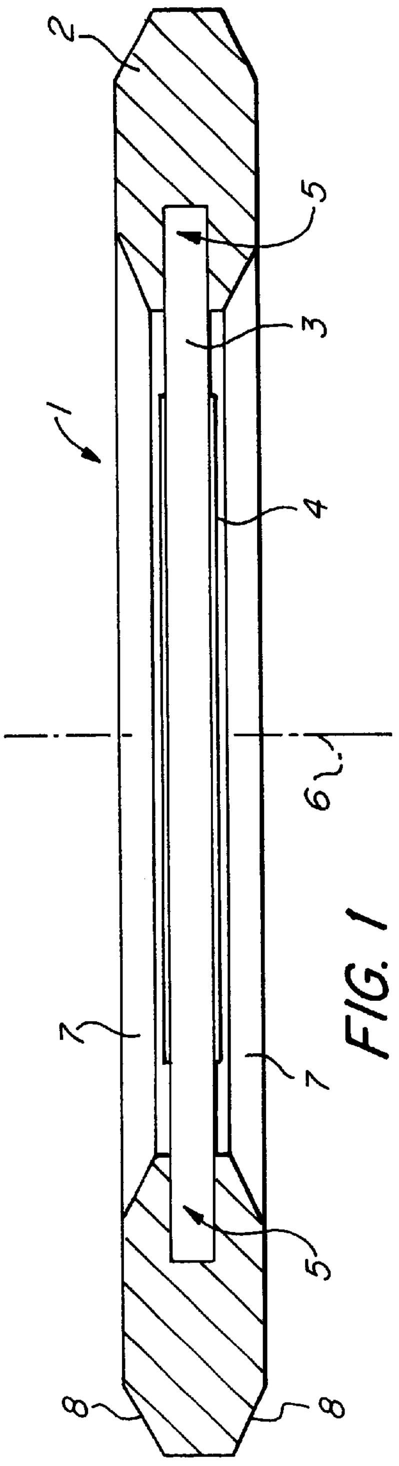
FIG. 1 shows a section along the axis of symmetry through a plastic counter according to the invention.
Figure 2:
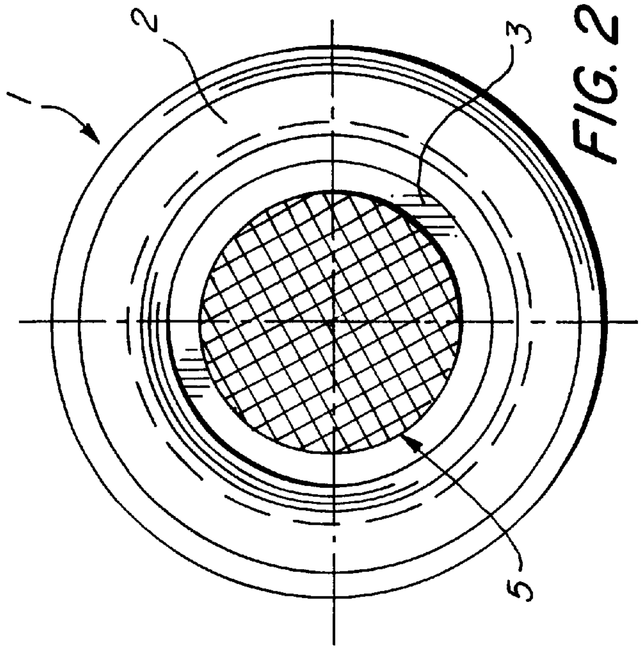
FIG. 2 is a top view of the plastic counter of FIG. 1.
Figure 4:
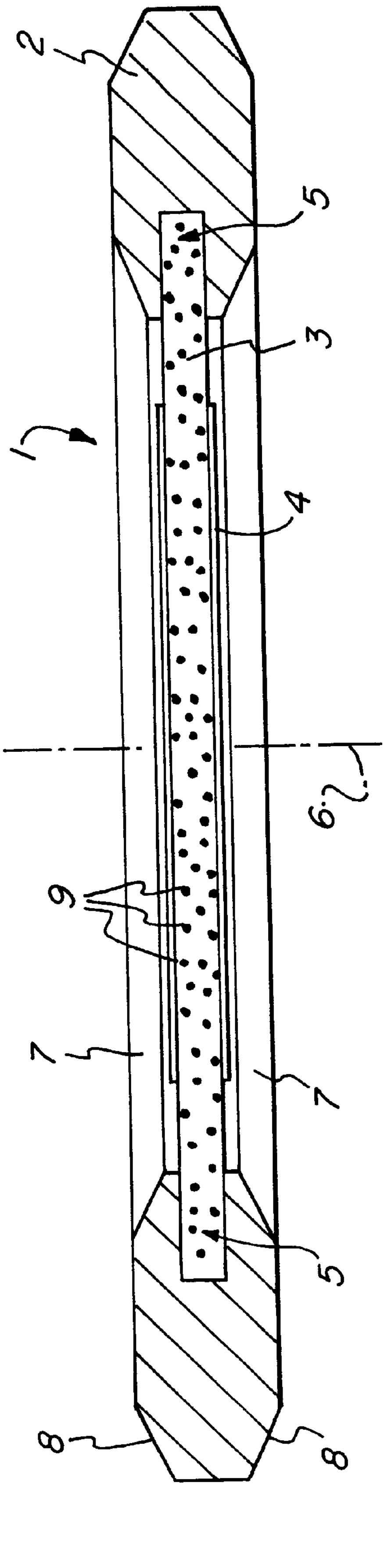
FIG. 4 shows a section along the axis of symmetry through a plastic counter according to the invention incorporating metal particles.
Figure 5:
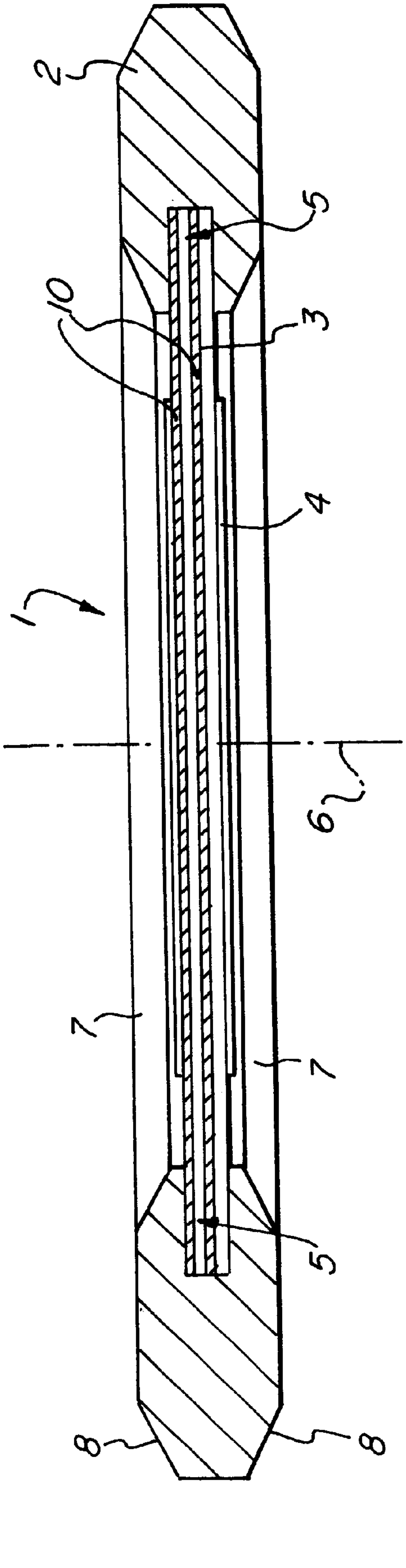
FIG. 5 shows a section along the axis of symmetry through a plastic counter according to the invention incorporating metal foil layers.

FIGS. 1 and 2 show the general composition of a disc-shaped counter 1 according to the invention, in section and top view respectively, the whole counter 1 being rotationally symmetrical about the axis of rotation 6. The plastic ring 2 surrounds the rim 5 of the filler piece 3 in a form-fitting manner, providing protection from mechanical damage to the filler piece 3 together with the information stamped in the impression region 4. The plastic ring 2 is made from a plastic material that is mechanically and chemically extremely robust, and is resistant to radiation.

About one-third of the radial width of the plastic ring 2 is penetrated by the rim 5 of the filler piece 3 in the example shown here; in other embodiments, half or three-quarters or more of the width of the plastic ring 2 may be radially penetrated by the filler piece 3.

The ratio between the axial dimensions of the filler piece 3 and plastic ring 2 is around 1:3 in the example shown; the plastic ring 2 is preferably made about three times as thick as the filler piece 3.

As further protection from mechanical damage, the edges of both the outer rim and the inner rim of the plastic ring 2 are bevelled, forming mechanically robust inner peripheral facets 7 and outer peripheral facets 8.

The impression region 5 is located approximately centrally with respect to the filler piece 3, and is provided on both sides. The same or different information can be shown on each side.

Figure 3:
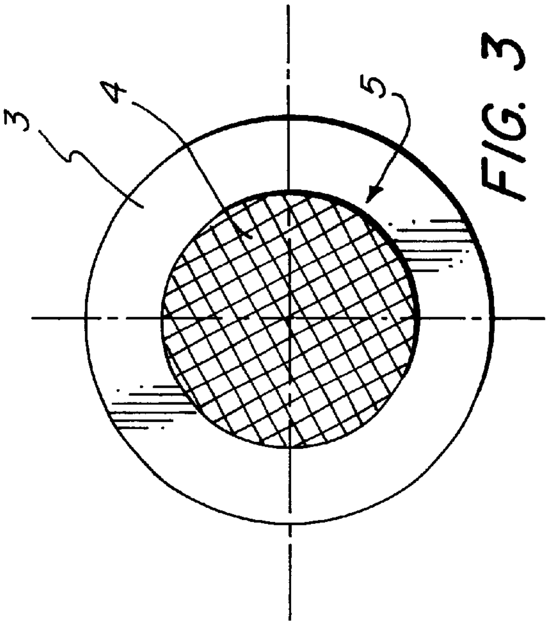
FIG. 3 is a top view of the separate filler piece.

FIG. 3 shows a top view of a separate insert piece 3 with its central impression region 4. It is evident, when this figure is viewed in conjunction with FIG. 2, that the rim portion 5 of the insert piece 3 held in the plastic ring 2 represents some 10% of the diameter of the insert piece 3. This rim portion 5 of the insert piece 3 may, however, be made more than 10% to add strength to the joint between the plastic ring 2 and the insert piece 3.

DRAWING LEGEND

1 counter
2 plastic ring
3 filler piece
4 impression region
5 rim
6 axis of rotation
7 inner facet
8 outer facet

What is claimed is:

1. A disc-shaped counter (1), comprising at least one ring-shaped plastic part (2) and a filler piece (3) held inside a recess in the plastic part, characterized in that the plastic ring (2) is applied on to the filler piece (3) in such a way that the plastic ring (2) surrounds the rim (5) of the filler piece (3) radially and axially in an at least partly form-fitting fashion and in that the material for the filler piece (3) is a plastic material.

2. A disc-shaped counter (1) according to claim 1, characterized in that fine metal particles and/or a metallic foil are/is incorporated in, or in the material of, or applied on to, the plastic filler piece (3).

3. A disc-shaped counter (1) according to claim 1, characterized in that the plastic filler piece (3) is formed from a sheet of laminated plastic and metallic foil.

4. A disc-shaped counter, comprising:

an outer ring having an inner peripheral groove therein;

an inner plastic filler piece having an outer periphery received and held within the inner peripheral groove of said outer ring; and a plurality of metal particles disposed on, within, or both on and within said inner plastic filler piece.

5. The disc-shaped counter of claim 4 wherein said plurality of metal particles comprise a plurality of magnetic metal particles.

6. The disc-shaped counter of claim 4 wherein said plurality of metal particles comprise a plurality of magnetizable metal particles.

7. The disc-shaped counter of claim 4 wherein said plurality of metal particles comprise a plurality of metal particles having a size of about 100 $\mu$m.

8. A disc-shaped counter, comprising:

an outer ring having an inner peripheral groove therein;

an inner plastic filler piece having an outer periphery received and held within the inner peripheral groove of said outer ring; and at least one metal foil layer disposed on, within or both on and within said inner plastic filler piece.

9. The disc-shaped counter of claim 8 wherein said inner plastic filler piece and said at least one metal foil layer are formed from a laminated sheet.

* * * * *